United States Patent Office 3,700,403
Patented Oct. 24, 1972

3,700,403
PROCESS FOR FLAMEPROOFING CELLULOSE-CONTAINING FIBROUS MATERIALS
Hermann Nachbur, Dornach, and Arthur Maeder, Therwil, Switzerland, assignors to Ciba-Geigy AG, Basel, Switzerland
No Drawing. Continuation-in-part of application Ser. No. 715,980, Mar. 26, 1968, now Patent No. 3,639,539, dated Feb. 1, 1972. This application Jan. 12, 1971, Ser. No. 105,977
Claims priority, application Switzerland, Apr. 11, 1967, 5,131/67
Int. Cl. D06m *13/32, 15/54*
U.S. Cl. 8—115.6                         12 Claims

ABSTRACT OF THE DISCLOSURE

The present invention relates to a process for rendering cellulose-containing fibrous materials flameproof, which comprises applying to said materials an aqueous preparation containing phosphorus-containing N,N-dimethylolcarboxylic acid amides. The flameproof finish is resistant to washing and dry-cleaning and improves the dry crease angle and the wet crease angle of the finished material.

CROSS REFERENCE

This is a continuation-in-part of applicant's copending application Ser. No. 715,980, filed Mar. 26, 1968, now U.S. Pat. No. 3,639,539, the disclosure of which is relied on and incorporated by reference in this application.

The present invention relates to new phosphorus-containing N,N-dimethylolcarboxylic acid amides of the formula (1)

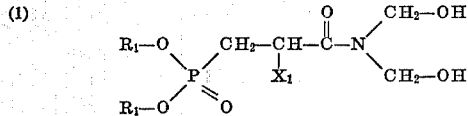

wherein $R_1$ denotes an alkyl or halogen alkyl residue bound to the oxygen atom by a carbon atom and $X_1$ denotes a hydrogen atom or a group of the formula

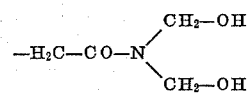

Furthermore there may especially be mentioned phosphorus compounds of the formula (2)

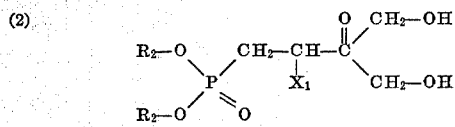

wherein $R_2$ denotes a methyl or ethyl residue and $X_1$ has the significance mentioned.

The phosphorus compound of the formula (3)

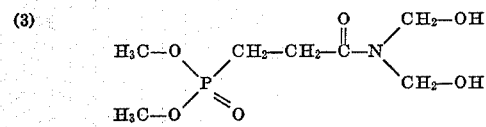

is of particular interest.

The compounds of Formula 1 are appropriately manufactured according to methods which are in themselves known, by reacting a compound of the formula (4)

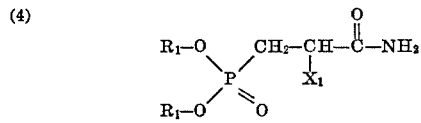

wherein $R_1$ and $X_1$ have the significance mentioned, with paraformaldehyde.

Analogously, compounds of the Formula 2 are obtained if a compound of the formula (5)

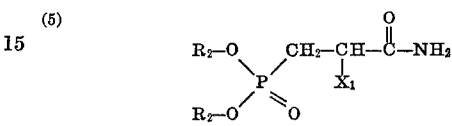

wherein $R_2$ and $X_1$ have the significance mentioned, is reacted with paraformaldehyde.

Reaction of 3 - (dimethylphosphono) - propionic acid amide with paraformaldehyde yields the compound of Formula 3.

The reaction of the amides with the paraformaldehyde is advantageously carried out at temperatures of up to 150° C., preferably at 50 to 100° C.

Where appropriate, the reaction is carried out in the presence of a basic catalyst. Possible catalysts for this are both strong bases such as, for example, sodium or potassium hydroxide and also weak bases such as, for example, sodium acetate, magnesium carbonate or especially magnesium oxide.

The reaction mixture as a rule forms a cloudy melt on heating. The amount of the dimethylol compound formed can be determined by determining the formaldehyde bound as —CH$_2$OH. Depending on the batch, yields of dimethylol compound of 70 to 85% are achieved.

The invention also relates to a process for rendering cellulose-containing fibrous materials flameproof and is characterised in that an aqueous preparation is applied to these materials which contains at least one phosphorus compound of the Formula 1, and the materials are thereafter dried and subjected to a treatment at temperatures above 100° C.

Phosphorus compounds of Formula 2 are preferred, and the process for flameproofing is of very especial interest if 3-(dimethylphosphono)-propionic acid dimethylolamide is used as the phosphorus compound.

The pH-value of the aqueous preparations containing the compounds of the Formula 1 is advantageously less than 5. In order to achieve this, strong mineral acids such as sulphuric acid, nitric acid or preferably hydrochloric acid are added to the preparations. Instead of the acids themselves, especially hydrochloric acid, it is also possible to use compounds from which the corresponding acids are easily formed in water, for example even without warming, by hydrolysis. As examples, there may here be mentioned phosphorus trichloride, phosphorus pentachloride, phosphorus oxychloride, thionyl chloride, sulphuryl chloride, cyanuryl chloride, acetyl chloride and chloracetyl chloride. These compounds on hydrolysis exclusively yield acid decomposition products, for example cyanuric acid and hydrochloric acid. It may be advantageous to employ, instead of one of the strong acids mentioned, the acid mixtures corresponding to the hydrolysis products of one of the compounds just mentioned, that is to say for example to employ, instead of hydrochloric acid alone, a mixture of hydrochloric acid and orthophosphoric acid corresponding to the phosphorus pentachloride, appropriately in the molecular ratio 5:1.

In addition to the compounds of Formula 1 and the additives necessary for adjusting the pH-value, the preparations to be employed in accordance with the invention may contain further substances. It is possible to add an aminoplast such as a optionally etherified methylol-urea or methylol-melamine, for the example pentamethylol-melamine-dimethyl ether but this is not absolutely necessary in order to achieve a wash-resistant flameproof finish. These preparations preferably also contain a latent acid catalyst for accelerating the cure of the aminoplasts and for crosslinking the dimethylol compound of Formula 1. As latent acid catalysts there may be used the catalysts known for the cure of aminoplast on cellulose-containing material, for example ammonium chloride, ammonium dihydrogen orthophosphate, magnesium chloride, zinc nitrate and others.

On the other hand it may be of advantage for the preparations to contain a copolymer of (a) 0.25 to 10% of an alkaline earth salt of an $\alpha,\beta$-ethylenically unsaturated monocarboxylic acid, (b) 0.25 to 30% of an N-methylolamide or N-methylolamide ether of an $\alpha,\beta$-ethylenically unsaturated monocarboxylic or dicarboxylic acid and (c) 99.5 to 60% of at least one other copolymerisable compound, this copolymer being obtainable by polymerisation in aqueous emulsion. These copolymers and their manufacture are also known. The conjoint use of such a copolymer can have a favourable effect on the tensile strength and abrasion resistance of the treated fibrous material.

A plasticising finishing agent, for example an aqueous polyethylene emulsion or ethylene copolymer emulsion, should be mentioned as a further additive which is advantageous in many cases.

The content of the compound of Formula 1 in the aqueous preparation is appropriately chosen so that 10 to 28% are applied to the material which is to be treated, however it is necessary to take into account that the commercially available textile materials of native or regenerated cellulose can take up between 50 and 120% of an aqueous preparation.

The amount of the additive which is needed for adjusting the hydrogen ion concentration to a value of less than 5 depends on the actual chosen value and on the nature of the additive, though it is in any case essential not to go below a certain minimum. A certain excess over this minimum quantity is generally advisable. Large excesses offer no advantages and can even prove to be harmful.

If a polymer of the nature mentioned is further added to the preparation, then this is preferably done in small quantities, for example 1 to 10% relative to the amount of the compound of Formula 1. The same applies to any plasticiser used, where the corresponding amounts may again be 1 to 10%.

The preparations are now applied to the cellulose-containing fibrous materials, for example linen, cotton, rayon, rayn staple or also fibre mixtures of such materials and others such as wool, polyamide or polyester fibres, and this may be effected in a manner which is in itself known. It is advantageous to work with piece goods and to impregnate these on a padder of the usual construction, which is charged with the preparation at room temperature.

The fibrous material thus impregnated must now be dried and this is appropriately done at temperatures of up to 100° C. Thereafter the material is subjected to a dry heat treatment at temperatures above 100° C., for example between 130 and 200° C., and preferably between 150 and 180° C., the duration of which can be the shorter, the higher the temperature. This duration of the heating is for example 2 to 6 minutes at temperatures of 150 to 180° C. Since during this process of the methylol residues or methylol-ether residues in the compounds of Formula 1 are decomposed, water or an alcohol is hereby produced. Now it has been found that these volatile decomposition products must be continuously removed from the material in order that the desired effect can be achieved to the full extent. The equipment in which the heat treatment is carried out has to be chosen accordingly. Equipments in which, whilst maintaining the prescribed temperature, fresh air is continuously introduced and the air laden with the resulting volatile substances removed are very suitable. Such equipment, for example so-called turbo-fixing or nozzle-fixing equipment, is known.

A subsequent wash with an acid-binding reagent, preferably with aqueous sodium carbonate solution, for example at 40° C. up to boiling temperature and for 3 to 10 minutes, is appropriate in the case of a strongly acid reaction medium.

As already indicated, flameproof finishes can be obtained according to the present process which remain intact even after repeated washing or drycleaning and which do not cause any unacceptable reduction in the textile-mechanical properties of the treated material, especially if the copolymers and plasticisers mentioned are conjointly used. The dry crease angle and wet crease angle of the material which has been given a boil-resistance and flameproof finish are even further improved.

The percentages and parts in the following examples are units by weight, unless otherwise specified. The ratio of parts by volume to parts by weight is that of ml. to g.

EXAMPLE 1

181 parts of 3-(dimethylphosphono)-propionic acid amide, 96 parts of paraformaldehyde (97.5% strength) and 0.6 part of magnesium oxide are warmed to 100° C. internal temperature in a 500 parts by volume flask provided with a stirrer, a thermometer and reflux condenser. The cloudy melt hereupon produced is stirred for 30 minutes at 100° C., then cooled to room temperature, and the resulting syrup is diluted with 250 parts of deionised water. After filtering the solids content of the solution is determined and hereafter adjusted to 50%.

Determination of the formaldehyde bound as —$CH_2OH$ shows that 3 - (dimethylphosphono)-dimethylolpropionic acid amide is formed to the extent of about 83%.

EXAMPLE 2

The procedure of Example 1 is followed but using only 61.5 parts of paraformaldehyde (75.5% strength). Yield: 71%.

EXAMPLE 3

The procedure of Example 1 is followed but using only 61.5 parts of paraformaldehyde (97.5% strength) and the use of a basic catalyst (magnesium oxide) is dispensed with. On the other hand, the reaction time is extended to 2½ hours. Yield: 74%.

EXAMPLE 4

209 parts of 3 - (diethylphosphono) - propionic acid amine, 92.5 parts of paraformaldehyde (97.5% strength), 1.5 parts of magnesium oxide and 20 parts of toluene are warmed to 100° C. internal temperature in a 500 parts by volume flask provided with a stirrer, a thermometer and reflux condenser. The melt hereupon produced is stirred for one hour at 100° C. Hereafter it is cooled to room temperature and 200 parts of ethyl acetate as well as 0.5 part of kieselguhr are added, the mixture stirred whilst cooling to 10° C., and the unreacted paraformaldehyde which has separated out is thereafter filtered off.

After drying, 37 parts of a white powder are obtained which contains 31.8 parts of paraformaldehyde.

The filtrate is dried to constant weight in vacuo at 40° C. 245 parts of a colourless clear syrup are obtained which judging from the unreacted paraformaldehyde contains the dimethylol compound of 3-(diethylphosphono)-propionic acid amide to the extent of 97%.

EXAMPLE 5

104 parts of 3 - (bis - 2 - chloroethyl)-phosphono-propionic acid amide, 34.6 parts of paraformaldehyde (97.5% strength), 0.5 part of magnesium oxide and 20 parts of xylene are warmed to 100° C. internal temperature in a 500 parts by volume flask provided with a stirrer, a thermometer and reflux condenser. The melt produced is stirred for one hour at 100° C. It is then cooled to room temperature and 300 parts of ethyl acetate are added, the mixture is stirred whilst cooling to 10° C., and the unreacted paraformaldehyde which is separated out is then filtered off. After drying, 26 parts of a white powder are obtained which contains 16.4 parts of paraformaldehyde. The filtrate is dried to constant weight in vacuo at 40° C. 120 parts of a cloudy syrup are obtained which judging from the unreacted paraformaldehyde contains the dimethylol compound of 3 - (bis - 2 - chloroethyl)-phosphonopropionic acid amide to the extent of 77.5%.

EXAMPLE 6

140 parts of diethylphosphono-itaconic acid diamide, 92.5 parts of paraformaldehyde (97.5% strength), 1.5 parts of magnesium oxide and 50 parts of xylene are stirred for one hour at 100 to 115° C. internal temperature in a 500 parts by volume flask provided with a stirrer a thermometer and reflux condenser. Hereafter the mixture is cooled to 50° C. and dried to constant weight in vacuo. The remaining paste is stirred in 300 parts of warm methanol, then cooled to 10° C., and the insoluble component is filtered off and rinsed with 100 parts of methanol. After drying, 52 parts of a white powder are obtained, which contains 36.4 parts of paraformaldehyde. The methanol filtrate is dried to constant weight in vacuo at 50° C. 163 parts of a clear yellow viscous mass are obtained which according to the amount of the unreacted paraformaldehyde contains the tetramethylol compound of diethylphosphono-itaconic acid diamide to the extent of 89.4%.

EXAMPLE 7

The aqueous preparations I to V according to Table I are manufactured with the 50% strength aqueous solution described in Example 1. All figures denote parts by weight per 1000 parts by weight of finishing bath.

TABLE I

| Composition | Preparation No. | | | | |
|---|---|---|---|---|---|
| | I | II | III | IV | V |
| Product according to Example 1 (100%) | 270 | 270 | 270 | 270 | 270 |
| Pentamethylolmelaminedimethyl ether (60%) | | 85 | 42.5 | 85 | 42.5 |
| Urea (100%) | | | | 20 | 10 |
| Aqueous polyethylene emulsion (20%) | 30 | 30 | 30 | 30 | 30 |
| NH₄Cl (100%) | 4 | 4 | 4 | 4 | 4 |

One cotton fabric (fabric weight 220 g./m.²) at a time is padded with one of the preparations I to V, dried at 80° C., cured for 4½ minutes at 160° C., thereafter rinsed for 5 minutes in a 2% strength sodium carbonate solution at 95° C. and thereafter subjected to a 5×SNV-4 wash.

Results of the application whch was effected may be seen in Table II.

TABLE II

| | Preparation No. | | | | |
|---|---|---|---|---|---|
| | I | II | III | IV | V |
| Bath pH | 3.1 | 3.5 | 3.3 | 3.5 | 2.9 |
| Bath liquor taken up by the fabric, in percent | 82 | 83 | 82 | 83 | 82 |
| Dry deposit after curing, in percent | 15 | 18. | 16 | 20 | 17.5 |
| Flameproofness after 5×SNV-4 ¹ | (²) | (²) | (²) | (²) | (²) |

¹ Vertical test according to DIN 53906.
² Very good.

EXAMPLE 8

The aqueous preparations VI to VIII according to Table III are manufactured with the phosphorus compounds described in Examples 4, 5 and 6. All numbers denote parts by weight per 1000 parts by weight of finishing bath liquor.

TABLE III

| Composition | Preparation No. | | |
|---|---|---|---|
| | VI | VII | VIII |
| Product according to Example 4 (100%) | 530 | | |
| Product according to Example 5 | | 447 | |
| Product according to Example 6 | | | 358 |
| Pentamethylolmelaminedimethyl ether (60%) | 85 | 85 | 85 |
| NH₄Cl | 4 | 4 | 4 |

On cotton fabric at a time is padded with one of the preparations VI to VIII, dried at 80° C., cured for 4½ minutes at 160° C., hereafter post-washed for 5 minutes in a 2% strength sodium carbonate solution at 95° C. rinsed, dried and subjected to a 5×SNV-4 wash.

The results of the application effected may be seen from Table IV.

TABLE IV

| Data | Preparation No. | | | Untreated fabric |
|---|---|---|---|---|
| | VI | VII | VIII | |
| Bath pH | 4.1 | 5.4 | 3.9 | |
| Bath liquor taken up by the fabric, in percent | 82 | 82 | 80 | |
| Dry deposit after curing, in percent | 31 | 24.5 | 21.5 | |
| Dry deposit after curing and post-washing, in percent | 27 | 18 | 16.5 | |
| Crease angle: | | | | |
| Dry | ++ | + | ++ | oo |
| Wet | ++ | ++ | ++ | oo |
| Flameproofness after 5×SNV-4 ¹ | (²) | (²) | (²) | |

¹ Vertical test according to DIN 53906.
² Very good.

NOTE.—Assessment of crease angle: ++=very good, +=good, o=poor, oo=very poor.

EXAMPLE 9

No. 1: Preparation No. 1 is made by dissolving 300 g. of an 80% aqueous solution of a compound of the formula (6) 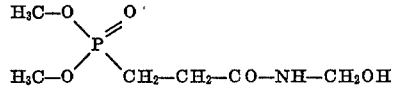

according to U.S. Pat. 3,374,242, and 4 g. of ammonium chloride in 1 liter of water. The resulting preparation No. 1 had a phosphorus content of 35 g./l.

No. 2: Preparation No. 2 is made by dissolving 270 g. of a compound of the formula (3) 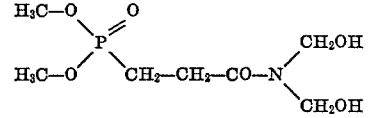

according to the present application, and 4 g. of ammonium chloride in 1 liter of water. The resulting preparation No. 2 had a phosphorus content of 35 g./l.

Cotton fabrics Nos. 1 and 2 (mercerized cotton, 150 g./m.²) are then padded with preparations Nos. 1 and 2, respectively. The liquor take-up was about 84%. After drying at 80° C. and curing for 4½ minutes at 160° C., the fabrics are rinsed for 5 minutes in a solution containing 2 g./l. of sodium carbonate at boiling temperature. Afterwards the fabrics are subjected to 5, 10, 20, 40 and 60 SNV-4-washes respectively (SNV-4 wash: washing at boiling temperature for 30 minutes in a bath containing per liter 5 g. of soap and 2 g. of sodium carbonate).

Then the fabric samples which had been washed, and SNV-4-washed are tested with regard to wash-fast flame resistance according to the "Vertical test" DIN 53906

(ignition time 6 seconds) in two different burning chambers:

(1) Wooden chamber: 38 cm. x 38 cm. x 68 cm.
(2) Metallic chamber: 35 cm. x 35 cm. x 75 cm.

The results are set forth in the following tables:

BURNING CHAMBER 1

| Flame resistance | Untreated fabric | Fabric No. 1 | Fabric No. 2 |
|---|---|---|---|
| After first wash: | | | |
| Burning time (sec.) | Burns | 1 | 0 |
| Char length (cm.) | | 12 | 9.5 |
| After 5 × SNV-4-wash: | | | |
| Burning time (sec.) | Burns | 19 | 0 |
| Char length (cm.) | | | 10 |
| After 10 × SNV-4-wash: | | | |
| Burning time (sec.) | Burns | Burns | 0 |
| Char length (cm.) | | | 9 |
| After 20 × SNV-4-wash: | | | |
| Burning time (sec.) | Burns | Burns | 0 |
| Char length (cm.) | | | 9 |
| After 40 × SNV-4-wash: | | | |
| Burning time (sec.) | Burns | Burns | 0 |
| Char length (cm.) | | | 9 |
| After 60 × SNV-4-wash: | | | |
| Burning time (sec.) | Burns | Burns | 0 |
| Char length (cm.) | | | 9.5 |

BURNING CHAMBER 1

| Flame resistance | Untreated fabric | Fabric No. 1 | Fabric No. 2 |
|---|---|---|---|
| After first wash: | | | |
| Burning time (sec.) | Burns | Burns | 0 |
| Char length (cm.) | | | 12 |
| After 5 × SNV-4-wash: | | | |
| Burning time (sec.) | Burns | Burns | 0 |
| Char length (cm.) | | | 11.5 |
| After 10 × SNV-4-wash: | | | |
| Burning time (sec.) | Burns | Burns | 0 |
| Char length (cm) | | | 12 |
| After 20 × SNV-4-bath: | | | |
| Burning time (sec.) | Burns | Burns | 0 |
| Char length (cm.) | | | 12 |
| After 40 × SNV-4-wash: | | | |
| Burning time (sec.) | Burns | Burns | 0 |
| Char length (cm.) | | | 10 |
| After 60 × SNV-4-wash: | | | |
| Burning time (sec.) | Burns | Burns | 0 |
| Char length (cm.) | | | 11.5 |

The difference between the results obtained in burning chambers 1 and 2 is due to the different structure of the chambers which causes different thermal conditions.

Cotton fabric No. 1 finished according to U.S. Pat. No. 3,374,292 is inferior in wash-fast flame resistance as compared to cotton fabric No. 2 finished with the present compound of Formula 3. Whereas present fabric No. 2 has a very good flame resistance also after 60 washes, fabric No. 1 only stands 5 washes or even after the first wash has lost its flame resistance.

We claim:
1. Process for flameproofing cellulose-containing fibrous materials characterised in that an aqueous preparation is applied to these materials which contains at least one phosphorus compound of formula

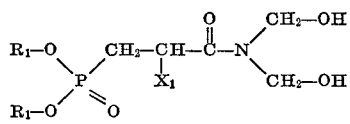

wherein $R_1$ denotes an alkyl residue or halogen alkyl residue bound to the oxygen atom by a carbon atom and $X_1$ denotes a hydrogen atom or a group of formula

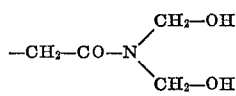

the materials are then dried and subjected to a heat-treatment.

2. Process according to claim 1, characterized in that a phosphorous compounds of formula

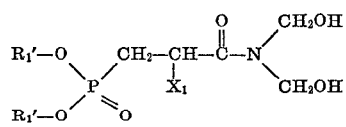

wherein $R_1'$ is alkyl or halogenalkyl containing 1 to 4 carbon atoms and $X_1$ is hydrogen or a group of the formula

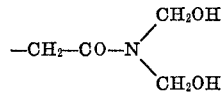

is used.

3. Process according to claim 1, characterized in that a phosphorus compound of formula

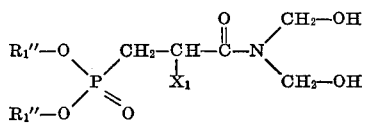

wherein $R_1'$ is methyl, ethyl or 2-chloroethyl and $X_1$ is hydrogen or a group of the formula

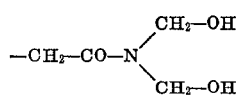

is used.

4. Process according to claim 1, characterized in that a phosphorus compound of formula

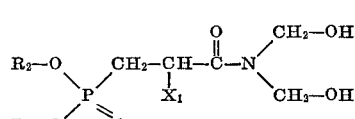

wherein $R_2$ denotes a methyl or ethyl residue and $X_1$ a hydrogen atom or a group of formula

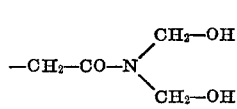

is used.

5. Process according to claim 1, characterized in that 3-(dimethylphosphono)-propionic acid dimethyloamide is used as the phosphorus compound.

6. Process according to claim 1, characterized in that the phosphorus compound of claim 1 is used wherein each $R_1$ radical is ethyl and $X_1$ is hydrogen.

7. Process according to claim 1, characterized in that the phosphorus compound of claim 1 is used wherein each $R_1$ radical is 2-chloroethyl and $X_1$ is hydrogen.

8. Process according to claim 1, characterized in that the phosphorus compound of claim 1 is used wherein each $R_1$ radical is ethyl and $X_1$ is the group

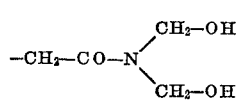

9. Process according to claim 1, characterized in that the aqueous preparation additionally contains an aminoplast.

10. Process according to claim 9, characterized in that pentamethylolmelamine-dimethyl ether is used as the aminoplast.

11. Process according to claim 1, characterized in that the aqueous prepartion contains a copolymer of (a) 0.25 to 10% of an alkaline earth salt of an $\alpha,\beta$-ethylenically unsaturated monocarboxylic acid, (b) 0.25 to 30% of an N-methylolamide or N-methylolamide ether of an $\alpha,\beta$-ethylenically unsaturated monocarboxylic or dicarboxylic acid and (c) 99.5 to 60% of at least one other copolymerisable compound, the copolymer being obtainable by polymerisation in aqueous emulsion.

12. Process according to claim 1, characterized in that the pH-value of the aqueous preparation is less than 5.

References Cited

UNITED STATES PATENTS

| | | | |
|---|---|---|---|
| 3,374,292 | 3/1968 | Zahir et al. | 260—943 |
| 3,639,539 | 2/1972 | Nachbar | 260—942 |

CHARLES E. VAN HORN, Primary Examiner

J. CANNON, Assistant Examiner

U.S. Cl. X.R.

8—Dig 21, 116.3, Dig. 4, 115.7, 128, 116 P; 106—15 FP; 117—136; 252—8.8, 8.1; 260—Dig. 24, 942, 943